Dec. 13, 1927.  
J. HIGGINSON  
1,652,896  
LIQUID FUEL CONSUMPTION AND DISTANCE INDICATOR OR  
REGISTER FOR MOTOR VEHICLES  
Filed May 9, 1923  
10 Sheets-Sheet 1

Inventor  
J. Higginson  
By Marks & Clark  
Attorneys

Dec. 13, 1927.

J. HIGGINSON

LIQUID FUEL CONSUMPTION AND DISTANCE INDICATOR OR
REGISTER FOR MOTOR VEHICLES

Filed May 9, 1923

Inventor
J. Higginson
By Marks & Clerk
Attorneys

Dec. 13, 1927.  
J. HIGGINSON  
1,652,896  
LIQUID FUEL CONSUMPTION AND DISTANCE INDICATOR OR REGISTER FOR MOTOR VEHICLES  
Filed May 9, 1923  10 Sheets-Sheet 3

Inventor  
J. Higginson  
By Marks&Clerk  
Attorneys

Dec. 13, 1927.
J. HIGGINSON
LIQUID FUEL CONSUMPTION AND DISTANCE INDICATOR OR REGISTER FOR MOTOR VEHICLES
Filed May 9, 1923
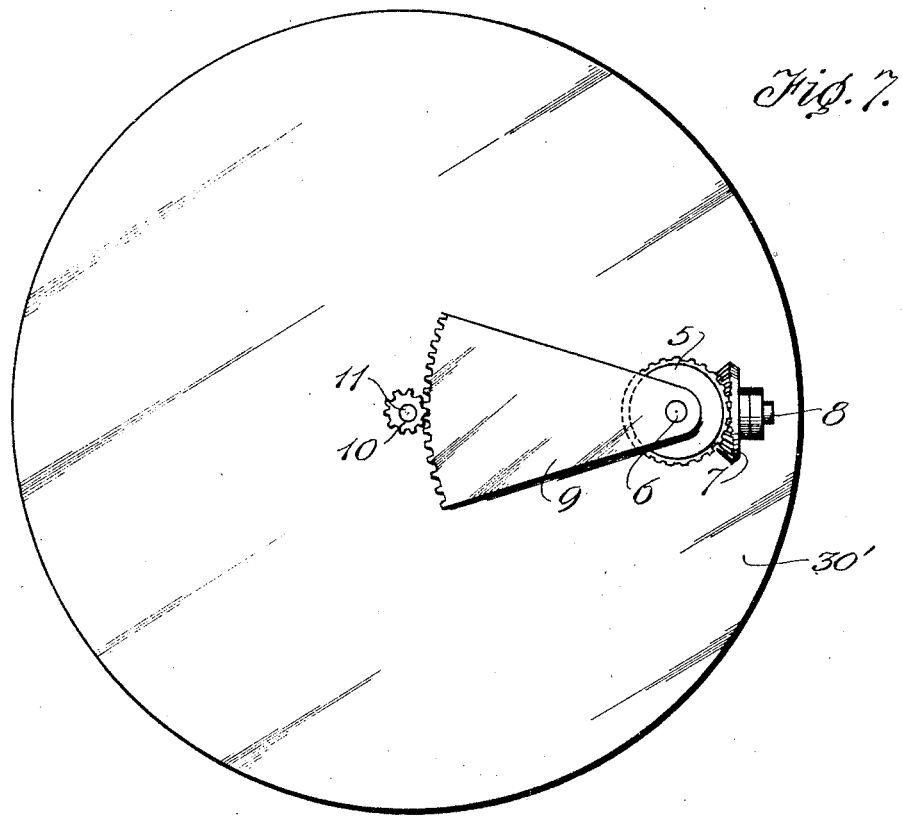
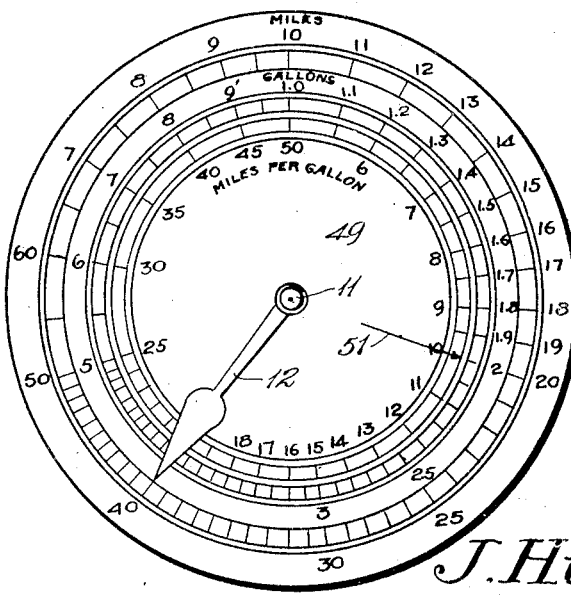
Inventor
J. Higginson
By Marks Clerk
Attorneys Dec. 13, 1927.                                              1,652,896
J. HIGGINSON
LIQUID FUEL CONSUMPTION AND DISTANCE INDICATOR OR
REGISTER FOR MOTOR VEHICLES
Filed May 9, 1923                    10 Sheets-Sheet 5

Inventor
J. Higginson
By Marks & Clerk
Attorneys

Dec. 13, 1927.  
J. HIGGINSON  
1,652,896  
LIQUID FUEL CONSUMPTION AND DISTANCE INDICATOR OR REGISTER FOR MOTOR VEHICLES  
Filed May 9, 1923  10 Sheets-Sheet 6

Inventor  
J. Higginson  
By Marks&Clerk  
Attorneys

Dec. 13, 1927.
J. HIGGINSON
1,652,896
LIQUID FUEL CONSUMPTION AND DISTANCE INDICATOR OR
REGISTER FOR MOTOR VEHICLES
Filed May 9, 1923      10 Sheets-Sheet 7
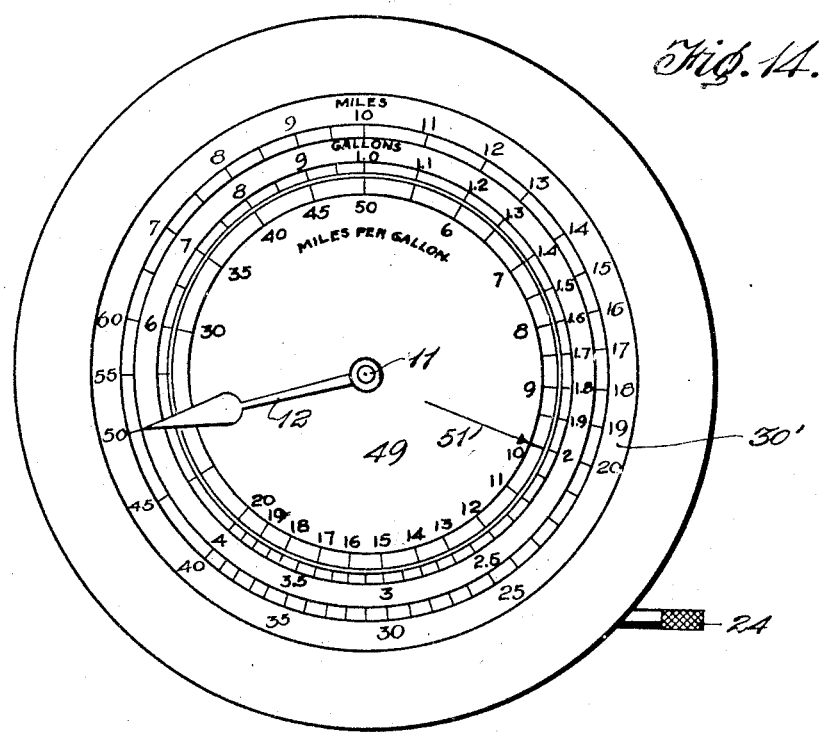
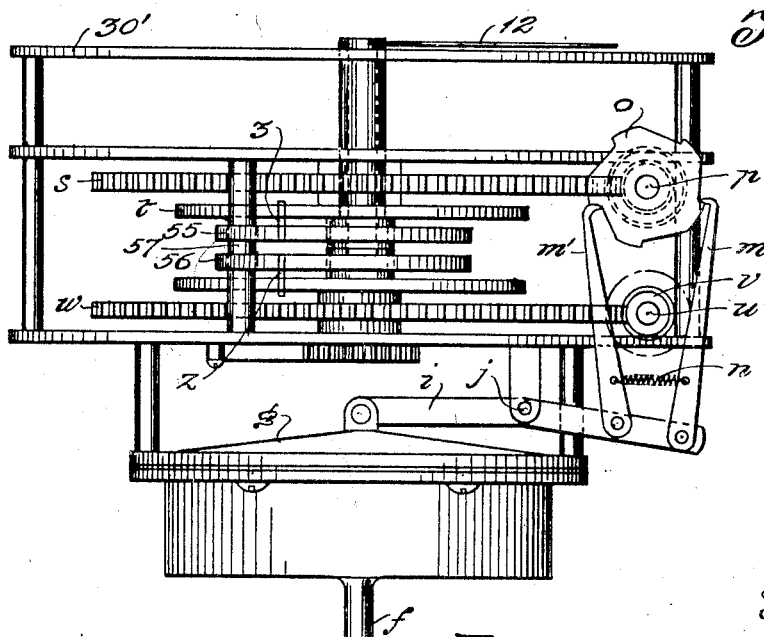
Inventor
J. Higginson
By Marks Clerk
Attorneys Inventor
J. Higginson
By Marks Clerk
Attorneys Dec. 13, 1927.

J. HIGGINSON 1,652,896

LIQUID FUEL CONSUMPTION AND DISTANCE INDICATOR OR
REGISTER FOR MOTOR VEHICLES

Filed May 9, 1923   10 Sheets-Sheet 9

Inventor
J. Higginson
By Marks Clerk
Attorneys

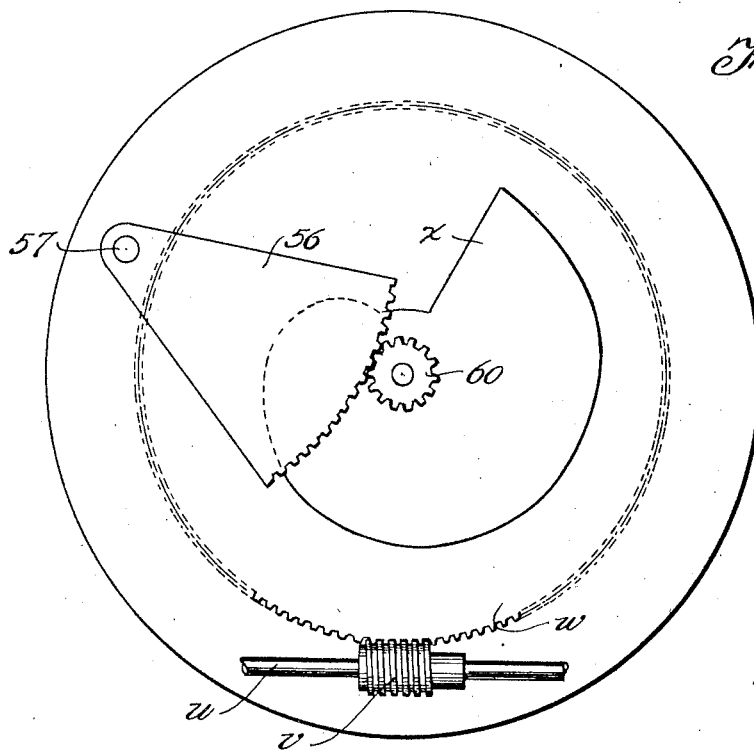
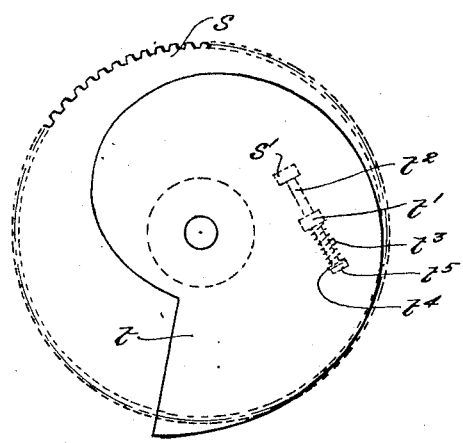
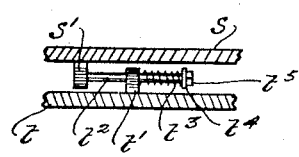

Patented Dec. 13, 1927.

1,652,896

UNITED STATES PATENT OFFICE.

JOSEPH HIGGINSON, OF STOCKPORT, ENGLAND.

LIQUID-FUEL CONSUMPTION AND DISTANCE INDICATOR OR REGISTER FOR MOTOR VEHICLES.

Application filed May 9, 1923, Serial No. 637,821, and in Great Britain July 12, 1922.

This invention relates to an instrument for giving a direct and continuous reading upon a motor vehicle of the consumption of liquid fuel in relation to the distance travelled by the vehicle.

Attempts heretofore made at providing such an instrument may be divided into three classes. In one class, a measured quantity or volume of liquid fuel is placed in a calibrated container and a test is made to ascertain the amount of such fuel which is consumed whilst the motor vehicle travels a certain distance, say a mile, as registered by a odometer. The final level of the fuel in the container will coincide with one or other of certain markings which indicate the consumption of fuel by the motor vehicle in, say, miles per gallon. This method is not satisfactory for several reasons. Firstly, the container has to be of relatively small size, and therefore each test is confined to a distance of say one mile. The road and weather or wind conditions which obtain during such short runs may give an entirely erroneous idea of the general performance of the vehicle. Secondly, the testing is hand controlled or the indications of two instruments have to be observed; there is liability therefore of considerable error. Thirdly, the calibrated container has to be replenished after each test. In the second class of attempt are instruments which are automatic in their action and are operated from odometer drives and from a vacuum feed tank which draws in a measured quantity of fuel from a low level tank and delivers that quantity to the engine carburetor. The instrument indicates the distance travelled by the vehicle for each quantity of fuel drawn into the vacuum tank and discharged to the carburetor. This method is unsatisfactory because the quantity of fuel dealt with for each indication of fuel consumption per distance travelled is small, usually about three ounces (a vehicle using one gallon of petrol in 30 miles would travel less than one-half mile whilst consuming 3 ounces) and therefore successive indications may be widely different according to whether the vehicle is ascending or descending a hill, has the wind with or against it and to the road surface. The objection to this type of instrument is therefore similar to that of the type of instrument previously referred to. Total fuel consumption and total distance readings may be given by instruments of this class and the average consumption is obtainable therefrom by calculation. This, however, is not sufficiently simple and straight forward for general use where a direct reading is called for. A third class of attempt has given the actual ratio of fuel consumed to distance travelled at any instant by suitable means operated by or from the fuel passing to the engine and a odometer drive. This indication, even if it can be obtained satisfactorily, has little or no practical value; it is undoubtedly much less useful than the indications given by the first two classes of instrument above referred to.

The chief object of my present invention is to provide a practical instrument which will indicate the average distance travelled by a vehicle per unit of fuel consumed during a journey or trip not exceeding a predetermined length (say 100 or 200 miles) and also up to any point in the said journey. With such an instrument, if the vehicle travels say about 20 miles for each gallon of fuel consumed, then throughout the journey after this ratio has been obtained, an indication in the neighborhood of this figure will be shown continuously, there being small changes only when the conditions are adverse or favorable; any marked change will show that some defect has developed. If a driver knows what the average performance of his vehicle ought to be, he can set his instrument by hand to indicate the same and when the vehicle has travelled a short distance he will ascertain whether the actual performance deviates from what it was expected to be. The instrument becomes therefore a reliable means of indicating the general performance of a motor vehicle and also a means of demonstrating in a very short space of time whether the vehicle is being propeller with normal efficiency.

My invention consists in a liquid fuel consumption indicator comprising, in combination, means operated from the vehicle in proportion to the distance travelled thereby, means operated by the apparatus by which liquid fuel is fed to the engine carburetor in measured quantities, two logarithmic cams, means whereby the said cams are angularly advanced with a progressive movement by the aforesaid means at speeds varying with the speeds of the latter, and indicators and scales so combined with the said cams as to indicate the average rate of fuel consumption to distance travelled per unit of fuel consumed since the commencement of the test.

My invention further comprises the combination with the logarithmic cams which are adapted to turn in opposite directions with a progressive movement, of means which engage the cam faces and rotate the sun wheels of an epicyclic or differential gear, the planet carrier of which turns an indicating finger moving over a scale having markings logarithmically spaced.

My invention further comprises means for resetting the indicator after a test is completed.

My invention further comprises the improved details of the combinations and arrangements of parts hereinafter described and claimed.

Referring to the accompanying sheets of explanatory drawings:

Figures 6 and 7 are detail views of the logarithmic cams and the means for operating the indicating finger moving over the dial plate;

Figures 8 to 13 illustrate a modified arrangement or construction of instrument;

Fig. 8 is a front view of the instrument dial;

Fig. 9 is an end view looking from left to right of Fig. 8;

Fig. 10 is a sectional side elevation looking from right to left of Fig. 8;

Figures 11, 12 and 13 are detail views of the cams to be hereinafter referred to;

Figures 14 to 20 illustrate a further modified form of instrument.

Fig. 14 is a front view of the dial plate of the instrument.

Figures 15 and 16 are end views looking from left to right, and right to left respectively of Fig. 14.

Fig. 17 is an inverted plan view of the instrument.

Fig. 18 is a sectional elevation of the instrument with certain parts omitted for the sake of clearness.

Figures 19 and 20 are detail views of the cams and cooperating parts to be hereinafter referred to.

Figures 21 and 22 are details of a certain modification for producing lost motion between certain parts of the device.

Figure 1:
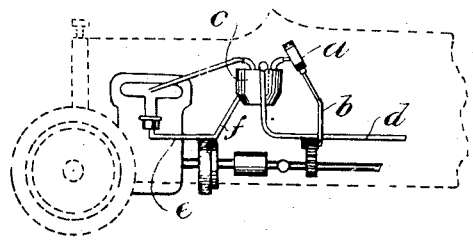
Fig. 1 is a diagram illustrating the general installation of a fuel consumption indicator to which my invention is applied.
Figure 4:
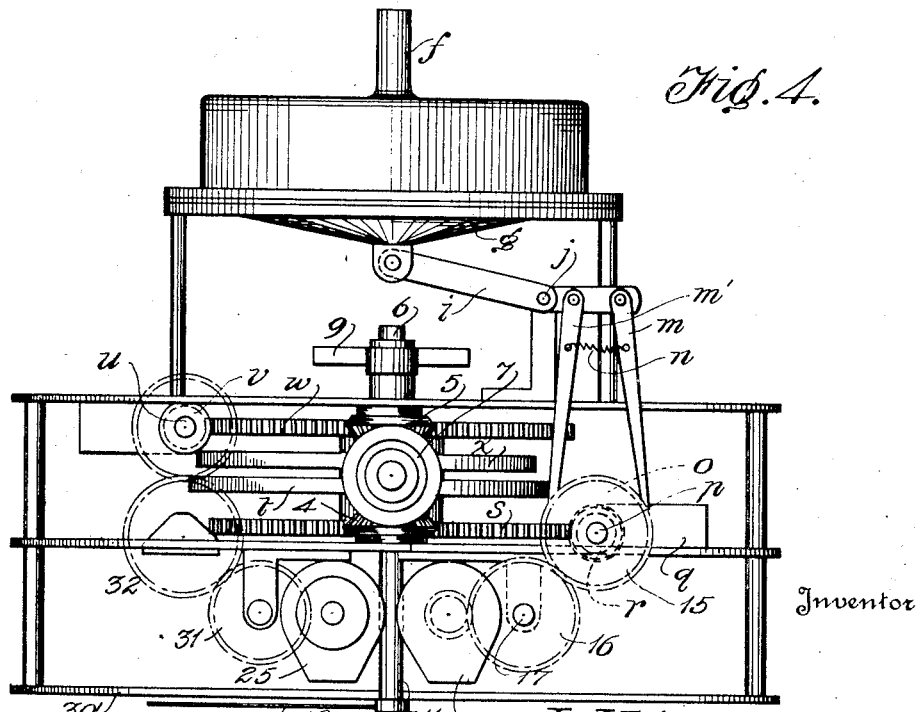
Fig. 4 is an end view looking from left to right of Fig. 2.
Figure 5:
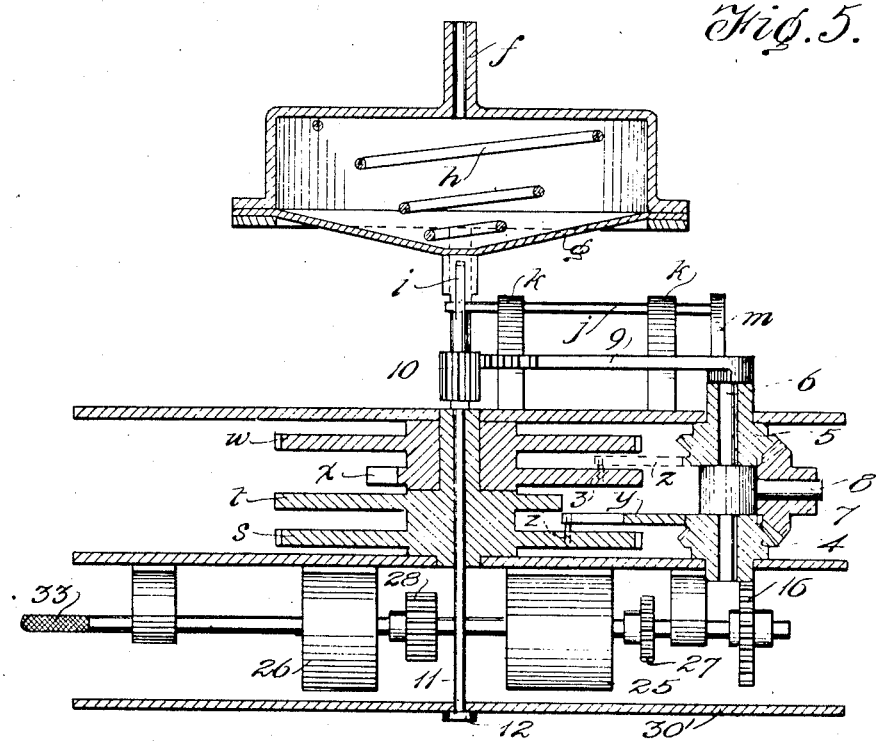
Fig. 5 is a sectional plan view of the instrument.

Referring in the first place to Fig. 1, the instrument is indicated at $a$; it derives its movements from two parts, one being the odometer or speedometer drive $b$ and the other the vacuum feed tank $c$ which draws fuel from the main tank (not shown) by the pipe $d$ and delivers it to the carburetor by way of the pipe $e$. The alternations of atmospheric pressure and vacuum in the portion of the tank $c$ into which the fuel is drawn from the main tank caused by means of the pipe $f$ (see also Figures 4 and 5) the operation of the diaphragm $g$ which during the suction period is drawn inwards against the action of the spring $h$ and during the atmospheric period is returned by the said spring to the normal position as shown in Fig. 5. I desire it to be understood that I make no claim to a diaphragm actuated counting mechanism operated by the alternation of pressure and vacuum in a vacuum feed tank of a motor vehicle. The construction of the said tank is adapted to ensure regularity in the volume of fluid drawn therein during each suction period.

The diaphragm $g$ oscillates an arm $i$ secured upon a spindle $j$ carried in brackets $k$, the said spindle carries pawls $m, m^1$ which are drawn towards one another by a spring $n$. The said pawls engage a ratchet wheel $o$. During the movement of the diaphragm $g$ under the suction action, the pawl $m^1$ pushes against a tooth of the ratchet wheel $o$ and rotates the latter in the direction of the arrow. During the return movement of the diaphragm, the pawl $m$ comes into action and turns the ratchet wheel $o$ through a further angular distance in the same direction. It will be seen therefore that the ratchet wheel is turned during each direction of movement of the diaphragm $g$.

Figure 3:
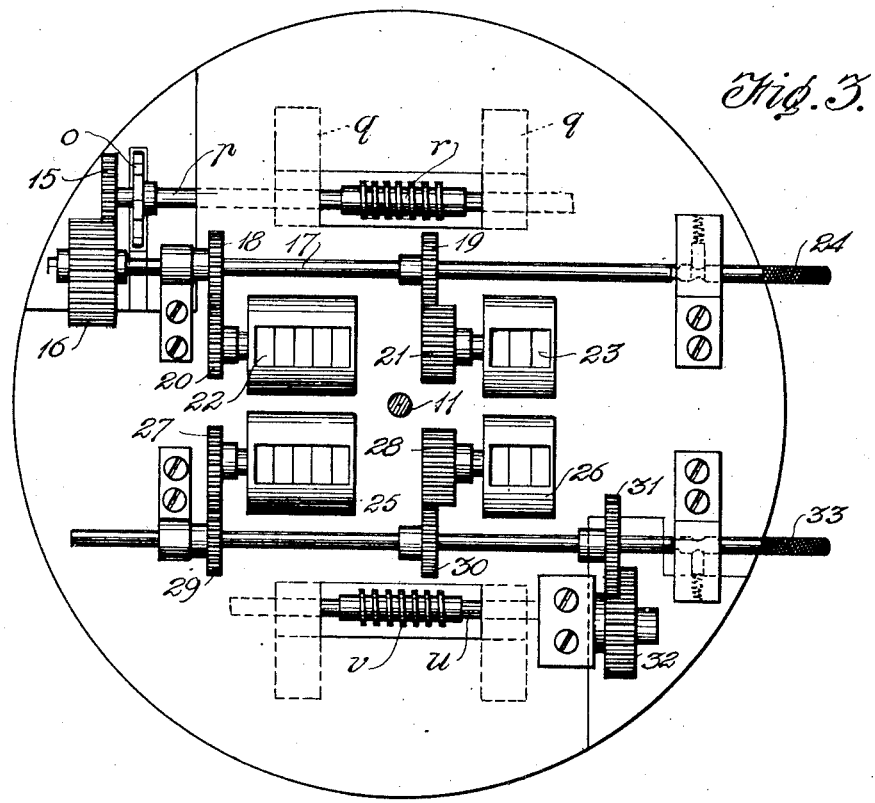
Fig. 3 is a similar view but with the dial plate removed.

The ratchet wheel $o$ is secured upon a spindle $p$ (see Fig. 3) journalled in brackets $q$ and having the worm $r$ thereon. The latter rotates the worm wheel $s$ which is adapted to rotate a cam $t$.

The odometer drive $b$ (Fig. 1) rotates the spindle $u$ (Fig. 4) upon which is the worm $v$ which rotates the worm wheel $w$ adapted to rotate the cam $x$.

The cams $x$ and $t$ are angularly advanced in opposite directions by progressive movements of the odometer driven spindle $u$ and the pawl and ratchet rotated spindle $p$ respectively.

Figure 6:
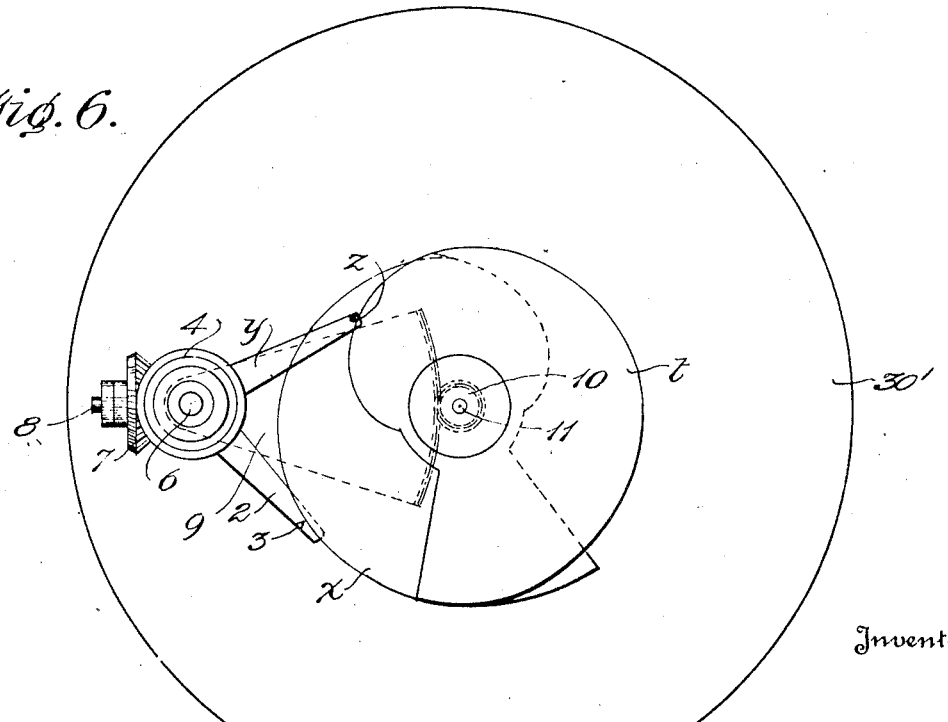
Figure 10:
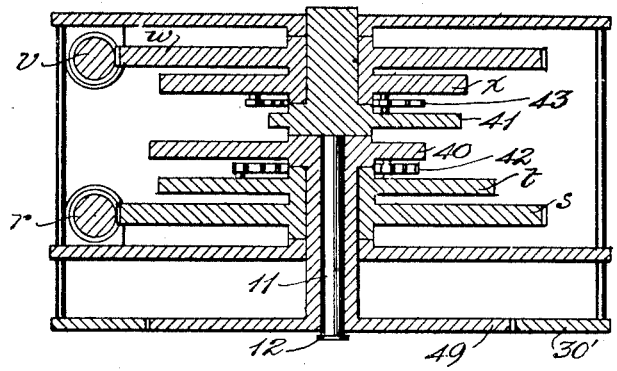
Figure 9:
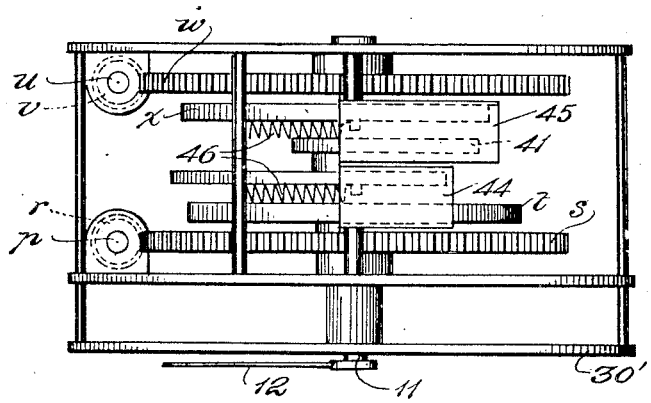
Figure 11:
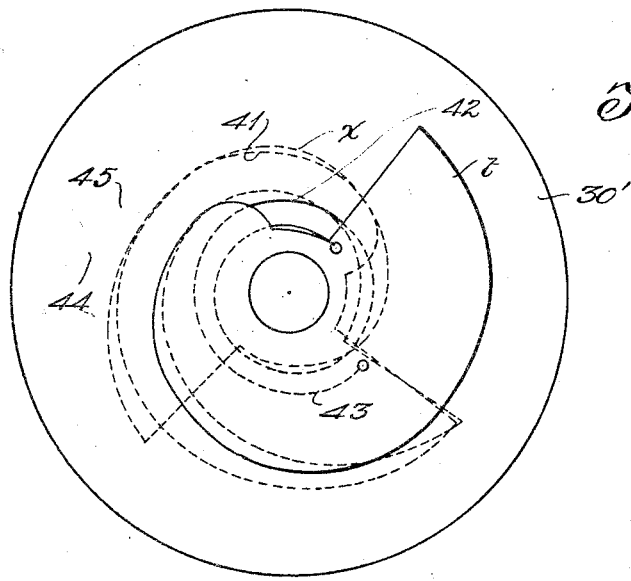

An arm $y$ with a projecting knife edged part $z$ rides upon the surface of the cam $t$ and a corresponding arm 2 with projecting piece 3 rides upon the cam $x$ (see Fig. 6). The arm $y$ is secured to the sun wheel 4 and the arm 2 to the sun wheel 5. The said sun wheels rotate freely upon a spindle 6 which forms the carrier for the planet wheel 7 of an epicyclic or differential gear. It will be understood that if the wheels 4 and 5 turn in opposite directions at equal speeds, the planet wheel 7 will rotate freely upon the spindle 8 forming part of the planet carrier, but any difference in the relative speeds of the sun wheels will cause the planet carrier to rotate the spindle 6 about its axis at a speed proportional to such difference. To the end of the said spindle 6 is secured a toothed quadrant 9 which engages a pinion 10 on the spindle 11 (Figures 5 and 6) which carries the indicating finger 12 (see Figures 2 and 4). As the planet carrier only moves at one half the difference between the speeds of the sun wheels, I arrange for the quadrant 9 and pinion 10 to give a two to one speed increase. To properly shape the cams $t$ and $x$, Figure 6, to cooperate with the indicating hand 12 of the dial of Fig. 2, the cams $t$ and $x$ are produced in such a way that for every tenth of a turn of the cam the finger 12 on the dial is moved through the logarithm of the corresponding number. Of course the cams which are thus formed must take account of the angularity of the arms $y$ and 2 as they move over the cam surface.

The cams $t$ and $x$ have each a portion 13, 14 which is an arc of a circle. The calculation of fuel consumption of a motor vehicle is usually made in distance per unit of fuel consumed. The circular portion of the cam $t$ (which may be termed the fuel cam) is of a length corresponding with the distance the said cam is turned whilst unit volume of fuel is passed through the portion of the vacuum feed tank in which the pressure alternations occur which operate the diaphragm $q$. The two curves on the two cams are identical and the lengths of the circular portions the same.

Upon the worm spindle $p$, I provide a spur wheel 15 which meshes with a spur wheel 16 on a shaft 17 which has pinions 18, 19 thereon for driving the wheels 20, 21 of two counting devices 22, 23. The counting device 23 serves to indicate the total fuel consumption during a test whilst the counter 22 gives the total consumption since the instrument was installed. The spindle 17 is movable longitudinally so that the wheel 18 can clear its mating wheel 20 whilst the wheels 16 and 21 are broad wheels so that the wheels 15 and 19 are always in mesh therewith. When the wheels 18 are free from the wheel 20, the handle 24 on the spindle 17 can be turned to reset the counter 23 to zero and to move the cam $t$ back to its initial position, without interfering with the indications of the total consumption counter 22. A similar arrangement of counters 25, 26 with their operating wheels 27, 28, 29 and 30 and with wheels 31 and 32 rotated by the mileometer drive is employed for indicating the total distance travelled and the distance travelled during the test. The "trip" counter 26 and the cam $x$ are reset by turning the handle 33.

Figure 2:
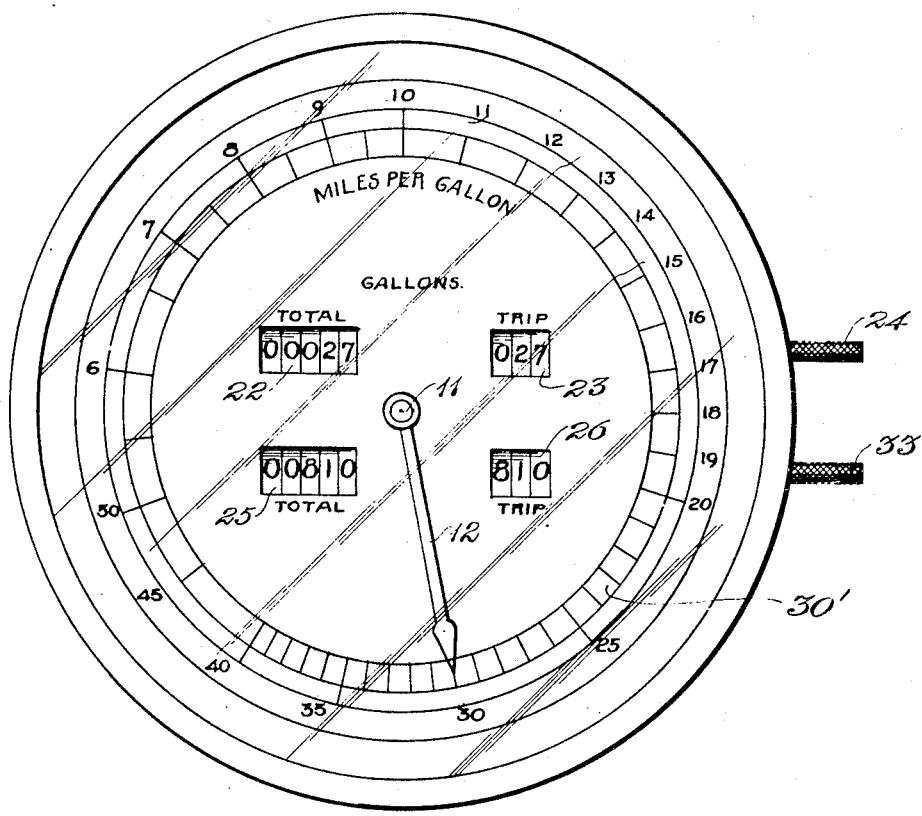
Fig. 2 is a front elevation of the indicating instrument.

The instrument can be made use of in either of two ways: If the cams $t$ and $x$ be reset so that the parts $z$ and 3 of the arms $y$ and 2 are against the circular face of the cams, then the two cams will impart no movements to the said arms $y$, and 2 and so to the epicyclic gear and the finger 12, whilst the said parts $z$ and 3 ride upon the circular parts of the cams but the distance traversed and fuel consumed are indicated by the trip counters 23 and 26. The arm 2 which rides on the distance cam $x$ will engage the peripheral portion of its cam first in all cases where a motor vehicle travels more than ten miles per gallon of fuel or ten units of distance for one unit of fuel consumed and will act through the differential gear to cause the finger 12 to advance over the scale 30' indicating the distance travelled per unit of fuel consumed. Until, however, one unit volume of fuel has been consumed as indicated by the trip counter 23 for fuel, no ratio reading is given for the fuel cam $t$ has not moved the arm $y$. Immediately, however, unit volume of fuel has been consumed, the epicyclic gear acts to subtract the logarithm of the value relating to fuel consumed from that relating to distance travelled and by the planet carrier spindle 6, and the parts operated thereby including the finger 12 and the dial 30, the indications on which are properly spaced, gives the actual ratio of the said values on the dial 30'; if, for example, a motor vehicle travels 30 miles per gallon of fuel consumed, the finger 12 will point to 30 as shown in Fig. 2. The finger 12 will now remain stationary unless the rate of fuel consumed per distance travelled varies. The cams $t$ and $x$ are, however, gradually advancing and any variation in the values is averaged over the whole period of the test or trip. Thus, if the average fuel consumed per distance travelled over a distance of 60 miles be 30 miles per gallon, then if for the next 20 miles due to some adverse influence or defect the vehicle only travelled 20 miles per gallon, the reading given by the pointer 12 would be 26.6 miles per gallon for the trip of 80 miles. With an indicator of the second type mentioned above, the reading during the latter part of the journey might be 20 miles per gallon over one short distance, with say 50 miles per gallon when going down a long hill with the engine in neutral and the car going by its own weight. Such erratic readings can have little or no value, as a low reading due to a defect might be attributed to road conditions. With my improved apparatus in which adverse or favorable periods are averaged out over the whole period of the test, any marked change in the reading will show that a defect has developed upon the vehicle, such as a sparking plug may be misfiring, a carburetor jet choked or the like. The reading given by the finger 12 at any time after unit volume of fuel has been consumed is therefore a reliable guide to the average performance of the vehicle to which it is fitted.

If the vehicle travels less than 10 units of distance (e. g. miles) for each unit of fuel consumed (e. g. gallons) then true ratio readings will be given on the dial 30' only when the vehicle has travelled a distance of ten miles if the total distance represented by the cam $x$ be 100 miles and the circular portion of the cam be one-tenth of a circle.

It will of course be appreciated that a complete turn of the distance cam can correspond to any desired distance according to the ratios of the driving wheels employed. For example, one turn of the distance cam $x$ may correspond to 200 miles. Alternatively and to give more rapid results, the unit of fuel may be less than a gallon, say one-half gallon, that is to say a ratio of distance travelled to fuel consumed is given when one-half gallon of fuel has been consumed.

The second method of using the instrument consists in setting the finger 12 by hand by turning the handles 24 and 33 so that it indicates a value which is considered to be the average performance of the vehicle. Thus the finger may be reset to indicate 30 miles per gallon.

By this method, the reading is immediately varied if the vehicle performance differs from the value to which the instrument was set and it is unnecessary to wait until the unit of fuel has been consumed to get a result. In resetting the parts by the handles 24 and 33 in accordance with this method of working, the handle 33 should be turned to indicate on the trip counter 26 the distance which the vehicle is thought to travel for unit consumption of fuel; the handle 24 is then turned till the trip counter 23 indicates one unit of fuel. If this method of working be always adopted, the circular parts 13 and 14 of the cams $t$ and $x$ may be done away with.

Instead of providing the cams with a true circular part, I may if desired, provide for a period of lost motion corresponding to one-tenth of each cam between the latter and the worm wheel or equivalent part by which it is operated when the cam is in its initial or zero position after re-setting. This arrangement is the equivalent of that herein described.

For instance, the cam $t$ may be provided with a lug $t'$ through which a rod $t^2$ passes slidably. One end of this rod may be secured fixedly in a lug $s'$ fixed on the gear $s$. The free end of this rod is surrounded by a spring $t^3$ which bears at one end against the lug $t'$ and at the other end against a plate or washer $t^4$ held on the rod by a nut $t^5$. Thus lost motion is provided between the gear and the cam.

In the modified instrument illustrated in Figures 8 to 13, the modified logarithmic cams $t$ and $x$ are rotated by means similar to those illustrated in Figures 2 to 7, but for convenience of illustration, many parts which are unnecessary for the understanding of the modification are omitted. Co-operating with each modified logarithmic cam is a plain spiral cam, the spiral cam 40 cooperating with the modified logarithmic cam $t$ and the spiral cam 41 with the modified logarithmic cam $x$. Volute springs 42, 43 attached at one end to a modified logarithmic cam and at the other end to a spiral cam tend to keep the two pairs of cams rotating at the same speed or in unison. There is a pivoted pallet 44, 45 associated with each pair of cams, each of the said pallets being held in contact with the peripheries of its two cams simultaneously by springs 46. The spiral cam 41 is secured upon the spindle 11 carrying the finger 12 whilst the cam 40 is fast upon the sleeve 48 carrying the central portion 49 of the dial plate on which are the readings—miles per gallon—indicated in Fig. 8. It will be seen that there are three scales upon the dial in Fig. 8. The outer scale indicates the distance travelled by the vehicle, the intermediate scale the volume of fuel consumed, and the inner scale the ratio of fuel consumed to distance travelled. The finger 12 is operated by the distance cams $x$ and 41 and indicates on the outer scale the total distance travelled. The finger may be transparent and through it can be seen on the inner scale the average distance travelled per unit of fuel consumed. The inner movable scale 49 has an indicating pointer or arrow 51 thereon which indicates on the intermediate scale the total fuel consumed. As shown, the miles travelled are 40, the fuel consumed two gallons and the miles per gallon 20.

The operation of the instrument is as follows:

The cams $t$ and $x$ are positively advanced in opposite directions with a progressive movement by the worms and worm wheels as described with reference to the previous form of instrument. The spiral cams 40 and 41 tend to move equally with their cooperating cams $t$ and $x$, but the pallets 44 and 45 press down upon the peripheries of the pairs of cams and ensure that the periphery of the spiral cam cannot rise above the periphery of the modified logarithmic cam. Each spiral cam can therefore follow the modified logarithmic cam to the extent allowed by the pallet which cooperates therewith. By reason of the configuration of a truly geometrical spiral cam, the angle through which it can turn when restrained at the periphery is proportional to the radius of the point where the restraint takes place.

Figure 12:
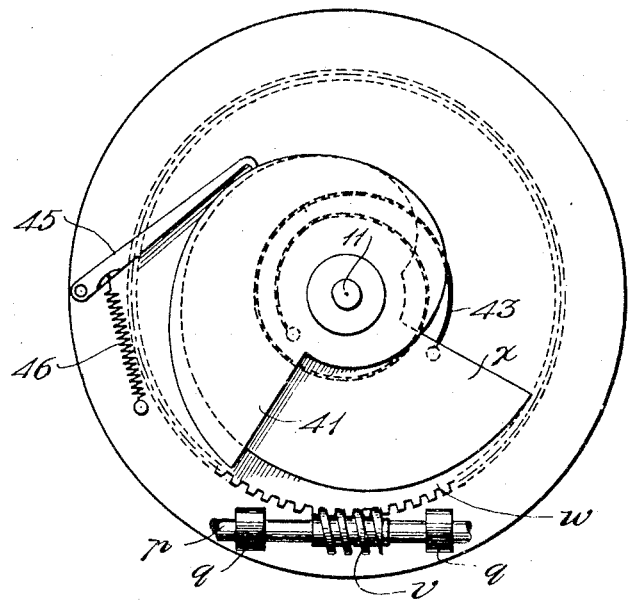
Figure 13:
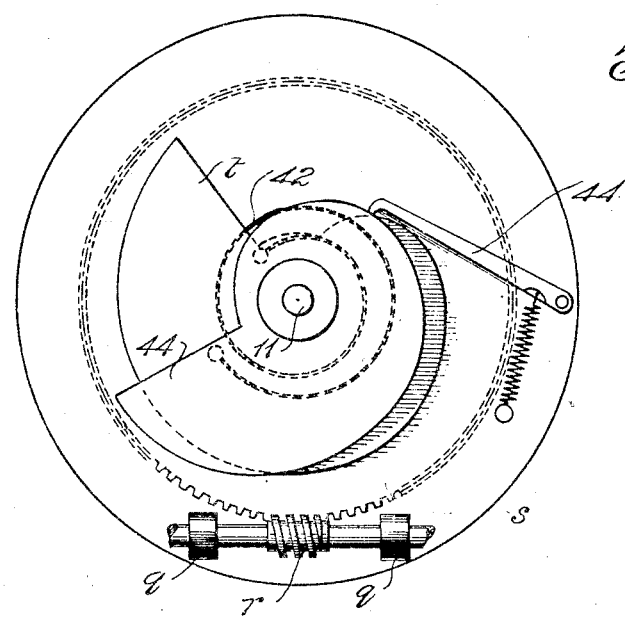
Figure 16:
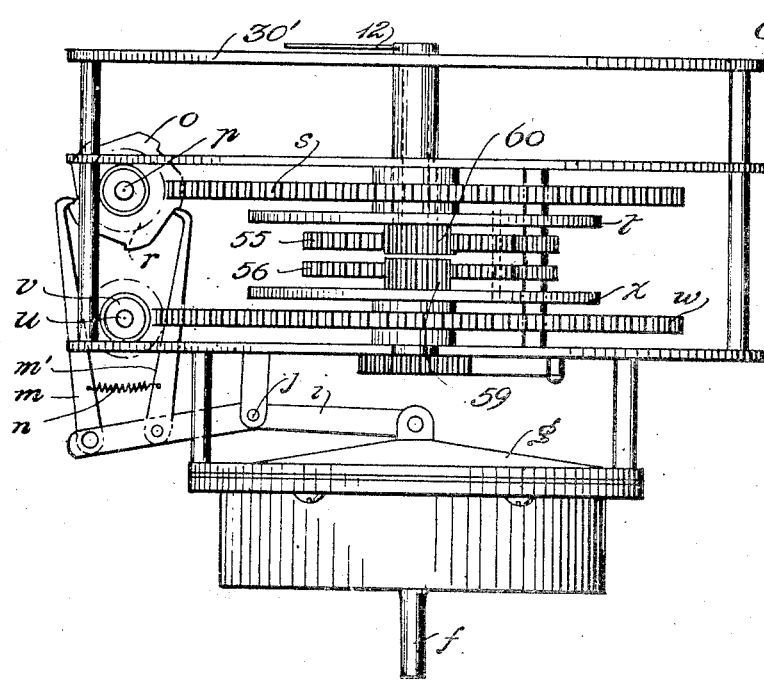
Figure 17:
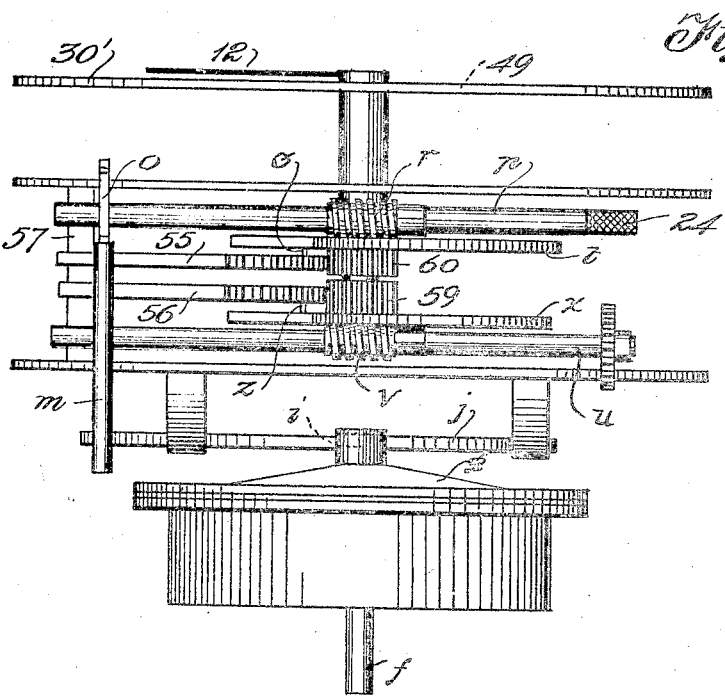
Figure 18:
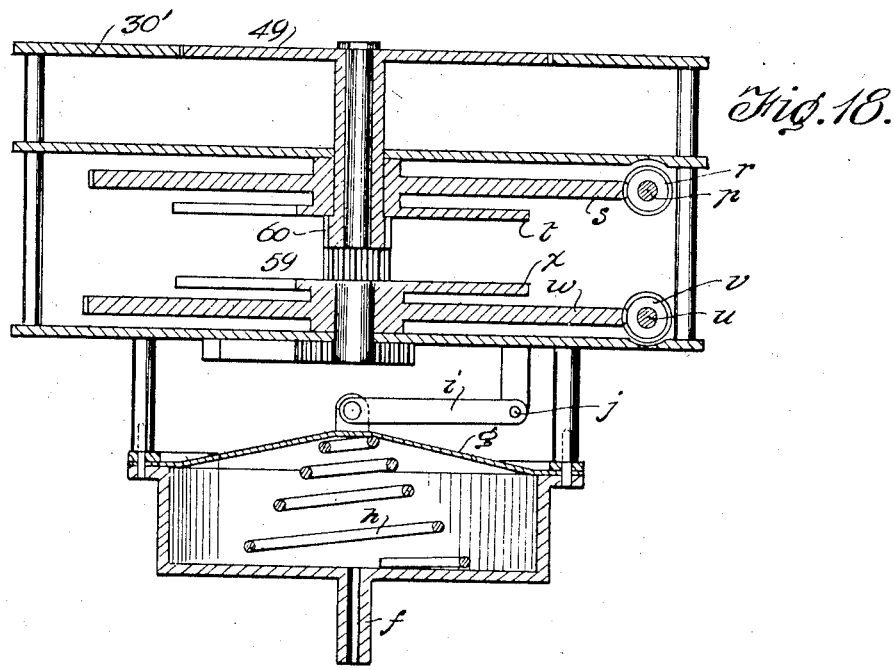
Figure 19:
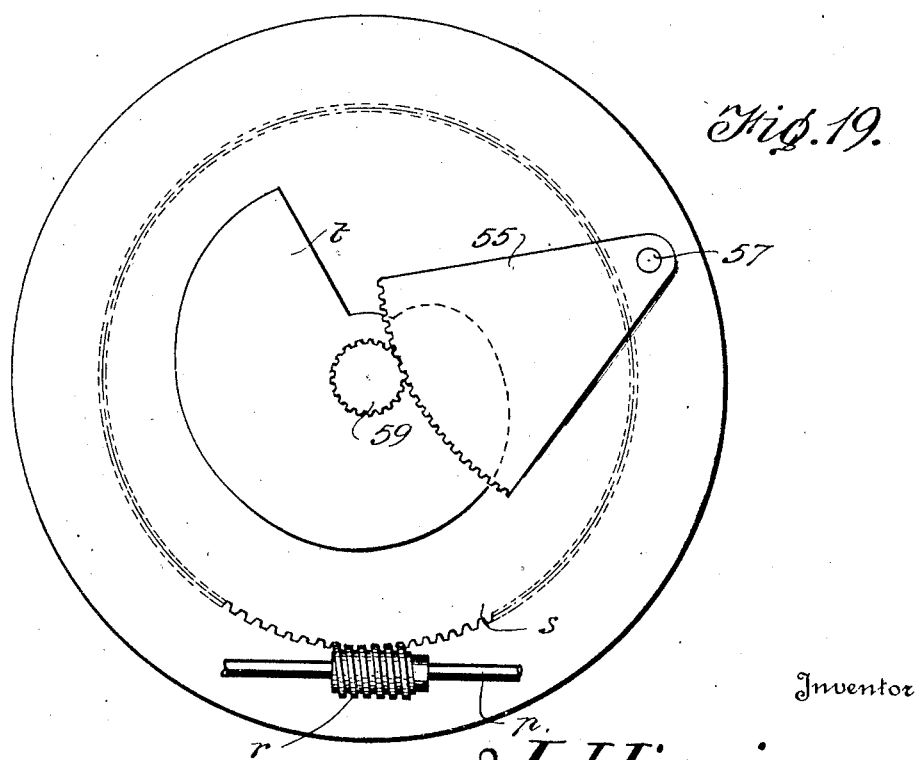

The ratio of movements of the dial 49 and Fig. 12 will be the difference between the logarithms of the angular movements of the worm wheels $r$ and $v$ and therefore the ratio of the movements which are proportional, to the fuel consumed and distance travelled by the vehicle. The scales on the dial are logarithmically divided and therefore give true readings of the respective values.

Referring to Figures 14 to 20, the arrangement of the modified logarithmic cams $t$ and $x$ and their operative mechanism is the same as in the previously described forms of instrument. The dial has a movable portion 49 as in the example illustrated at Fig. 8, the said movable portion being operated from the "fuel" modified logarithmic cam $t$ by the means hereinafter described. The finger 12 is operated from the "distance" modified logarithmic cam $x$. With each cam coacts a toothed quadrant 55, 56 pivotally supported at 57 and having each a projecting knife edged part $z$, 3 which bears upon the modified logarithmic cam. The quadrants rotate spur wheels 59 and 60, the latter turning the movable dial part 49 and the former the finger 12. The arrangement operates substantially as described in connection with the arrangement illustrated in Figures 8 to 13.

It will be understood that the movement imparted to the "fuel" modified logarithmic cam is of an intermittent though progressive character. The correct reading upon the indicating dial is given at the moment that the fuel cam is moved by the diaphragm mechanism, that is when a quantity of fuel equivalent to that last drawn into the suction chamber of the vacuum feed apparatus has been consumed and a new charge is about to be drawn into said chamber. The alteration in the indication immediately after the charge is drawn into the suction chamber is not great when each charge is about 3 ounces only. After a quantity equivalent to that last drawn into the suction tank is consumed, the indicating finger should have returned to the figure from which it receded if the vehicle has consumed the additional charge with normal efficiency.

I may vary the details of my improved instrument to suit any particular requirements. It will be understood that the details given in the figures are in substantially diagram form for the purpose of making clear the working of the instrument.

Having now particularly described and ascertained the nature of my said invention and in what manner the same is to be performed, I declare that what I claim is:

1. In a device of the kind described, an integrating cam-shaped disk arranged to move progressively in one direction under the influence of the travel movement of the vehicle for a predetermined distance and to remain in its position of maximum displacement when the vehicle stops, a second integrating co-axial cam-shaped disk arranged to move progressively in an opposite direction under the influence of fuel passing to the vehicle engine and to remain in its position of maximum displacement when the fuel stops, means co-operating with the disks for dividing one of the quantities integrated by the other and indicating the quotient of said integrating quantities.

2. In a device of the kind described, a cam-shaped disk arranged to be turned progressively and proportionately with the distance traveled by a vehicle, a second cam-shaped disk arranged to be turned progressively and proportionately to the amount of fuel passing to the vehicle engine, followers for the cams, means to integrate the total differential movements of said followers, and indicating means actuated by the first mentioned means and arranged to indicate the differential integration.

3. In a device of the kind described, a gear train adapted to be driven by the action of fluid fuel passing to an automobile engine, a second gear train adapted to be driven proportionately to the distance traveled by one of the ground wheels of the automobile, a pair of co-axial cams each progressively turned by a respective gear train, followers for said cams, a differential mechanism actuated by the movement of said cam and arranged to integrate the differential movements of the followers, and indicating means arranged to indicate the values of the obtained integrations.

4. In a device for determining the relation between the distance travelled by an automobile and the fuel consumption of its engine, a rotating modified logarithmic cam-shaped disk having the extent of its rotation determined by the total quantity of fuel consumed, a second rotating modified logarithmic cam having the extent of its rotation determined by the total distance travelled during the aforesaid fuel consumption, followers for said disks, a differential operated by the movements of said followers and arranged to integrate the differential of the movements of the followers, means for indicating the value of the obtained integration in units of distance per units of fuel measure.

5. In a device for determining the relation between the distance travelled by an automobile and the fuel consumption of its engine, a rotating modified logarithmic cam having the extent of its rotation determined by the total quantity of fuel consumed, a second rotating modified logarithmic cam having the extent of its rotation determined by the total distance travelled during the aforesaid fuel consumption, followers for said cams, a differential operated by the movements of said followers and arranged to integrate the differential of the movements of the followers, said differential comprising a pair of sun gears rotated in opposite directions by respective followers, a planet gear meshing with the sun gears and movable around the axis of the sun gears in accordance with the difference in total angular movements of the sun gears, and means to indicate the extent of movement of the planet gear about the axis of the sun gears.

6. In a device for determining the relation between the distance travelled by an automobile and the fuel consumption of its engine, a rotating modified logarithmic disk cam having the extent of its rotation determined by the total quantity of fuel consumed, a second rotating modified logarithmic disk cam having the extent of its rotation determined by the total distance travelled during the aforesaid fuel consumption, followers for said cams, a differential operated by the movements of said followers and arranged to integrate the differential of the movements of the followers, said differential comprising a pair of sun gears rotated in opposite directions by respective followers, a planet gear meshing with the sun gears and movable around the axis of the sun gears in accordance with the difference in total angular movements of the sun gears, a pointer having rotary movement about a center, and a dial over which said pointer moves provided with a logarithmic scale adjacent the free end of the pointer.

7. In a device for determining the relation between the distance travelled by an automobile and the fuel consumed by the automobile engine during the period of travel, a gear train adapted to be driven by the action of fluid passing to the engine, a modified logarithmic cam rotated by said gear train, a second gear train adapted to be driven from one of the ground wheels of the automobile, a second modified logarithmic cam rotated by said second gear train in a direction opposite the first cam, a pair of bevel sun gears, a shaft on which said gears are revolubly mounted in confronting relation, a stub shaft extending from said shaft between the sun gears, a planet gear journalled on said stub shaft and meshing with the sun gears, arms each fixed to one of the sun gears and engaging a respective cam to be moved in accordance with the cam movement, and means to indicate the extent of movement of the shaft produced by the differential action of said sun gear on the planet gear.

8. In a device for determining the relation between the distance travelled by an automobile and the fuel consumed by the automobile engine during the period of travel, a gear train adapted to be driven by the action of fluid passing to the engine, a modified logarithmic cam rotated by said gear train, a second gear train adapted to be driven from one of the ground wheels of the automobile, a second modified logarithmic cam rotated by said second gear train in a direction opposite the first cam, a pair of bevel sun gears, a shaft on which said sun gears are revolubly mounted in confronting relation, a stub shaft extending from said shaft between the sun gears, a planet gear journalled on said stub shaft and meshing with the sun gears, arms each fixed to one of the sun gears and engaging a respective cam to be moved in accordance with the cam movement, means to indicate the extent of movement of the shaft produced by the differential action of said sun gear on the planet gear and comprising a logarithmic scale of representing liquid measure units divided by distance units and a pointer geared to said shaft and traversing said scale.

9. In a device for determining the relation between the distance travelled by an automobile and the fuel consumption of its engine, a rotating cam, means progressively turning said cam by intermittent movements in accordance with the number of measured quantities of fuel consumed, a second rotating cam, means progressively and continuously turning said second cam whilst the automobile is travelling, followers for the cams, an integrating mechanism actuated by and arranged to integrate the differential movements of the followers, an indicating means arranged to indicate the values of the obtained integration, and hand operated means for adjusting the relative positions of said cams.

In testimony whereof I have signed my name to this specification.

JOSEPH HIGGINSON.